(12) United States Patent
Suekane et al.

(10) Patent No.: US 8,058,746 B2
(45) Date of Patent: Nov. 15, 2011

(54) CONVERTER FOR ELECTRICAL POWER RECOVERY

(75) Inventors: Kazuo Suekane, Osaka (JP); Satoshi Yamamoto, Osaka (JP)

(73) Assignee: Sansha Electric Manufacturing Co., Ltd., Osaka (JP)

( * ) Notice: Subject to any disclaimer, the term of this patent is extended or adjusted under 35 U.S.C. 154(b) by 429 days.

(21) Appl. No.: 12/095,934

(22) PCT Filed: Dec. 7, 2006

(86) PCT No.: PCT/JP2006/324415
§ 371 (c)(1),
(2), (4) Date: Jun. 3, 2008

(87) PCT Pub. No.: WO2007/066707
PCT Pub. Date: Jun. 14, 2007

(65) Prior Publication Data
US 2009/0267415 A1 Oct. 29, 2009

(30) Foreign Application Priority Data
Dec. 7, 2005 (JP) .................................. 2005-353050

(51) Int. Cl.
*H02J 3/14* (2006.01)
(52) U.S. Cl. ................. 307/39; 307/11; 307/38
(58) Field of Classification Search ........................ None
See application file for complete search history.

(56) References Cited

U.S. PATENT DOCUMENTS

| | | | |
|---|---|---|---|
| 5,592,074 A | | 1/1997 | Takehara |
| 5,691,630 A | * | 11/1997 | Chosa ............................ 323/267 |
| 5,736,795 A | * | 4/1998 | Zuehlke et al. ................ 307/130 |
| 6,028,373 A | * | 2/2000 | Kim et al. .......................... 307/31 |
| 6,614,232 B1 | * | 9/2003 | Mukai ............................. 324/426 |
| 7,557,463 B2 | * | 7/2009 | Yoshida .......................... 307/39 |
| 2004/0061379 A1 | * | 4/2004 | Gohlke ............................ 307/11 |
| 2005/0084721 A1 | * | 4/2005 | Ikuma et al. .................... 429/22 |
| 2006/0152084 A1 | * | 7/2006 | Tupman et al. ................. 307/64 |

FOREIGN PATENT DOCUMENTS

| | | |
|---|---|---|
| DE | 693 27 594 T2 | 7/2000 |
| JP | 02-311130 | 12/1990 |
| JP | 2004-092458 | 3/2004 |
| JP | 2005-045859 | 2/2005 |
| WO | 2004/100337 | 11/2004 |

OTHER PUBLICATIONS

English abstract of JP Pg-pub 2004-092458 to Yamamoto et al., Mar. 25, 2004.* English abstract of JP Patent 2-311130 to Mimizuka, Jan. 26, 1990.*
International Search Report for corresponding Application No. PCT/JP2006/324415 mailed Jan. 16, 2007.

* cited by examiner

*Primary Examiner* — Rexford Barnie
*Assistant Examiner* — Justen Fauth
(74) *Attorney, Agent, or Firm* — Renner, Otto, Boisselle & Sklar, LLP

(57) ABSTRACT

This converter for electrical power recovery (1) for supplying power to a load (6) includes an in-house power generation device (5) for supplying power in cooperation with input terminal power at a power input terminal (2). Moreover, it includes a thermal storage unit (12) which, when surplus power is generated in a state in which a target value for input terminal power is set to zero, thermally stores this power. Furthermore, a control unit (9) is included which, when surplus power is generated, decides whether or not breakage of a wire of a CT (7) has occurred by raising the target value for the input terminal power from zero to a predetermined value, and by deciding whether or not the power input terminal current is somewhat elevated from zero.

3 Claims, 2 Drawing Sheets

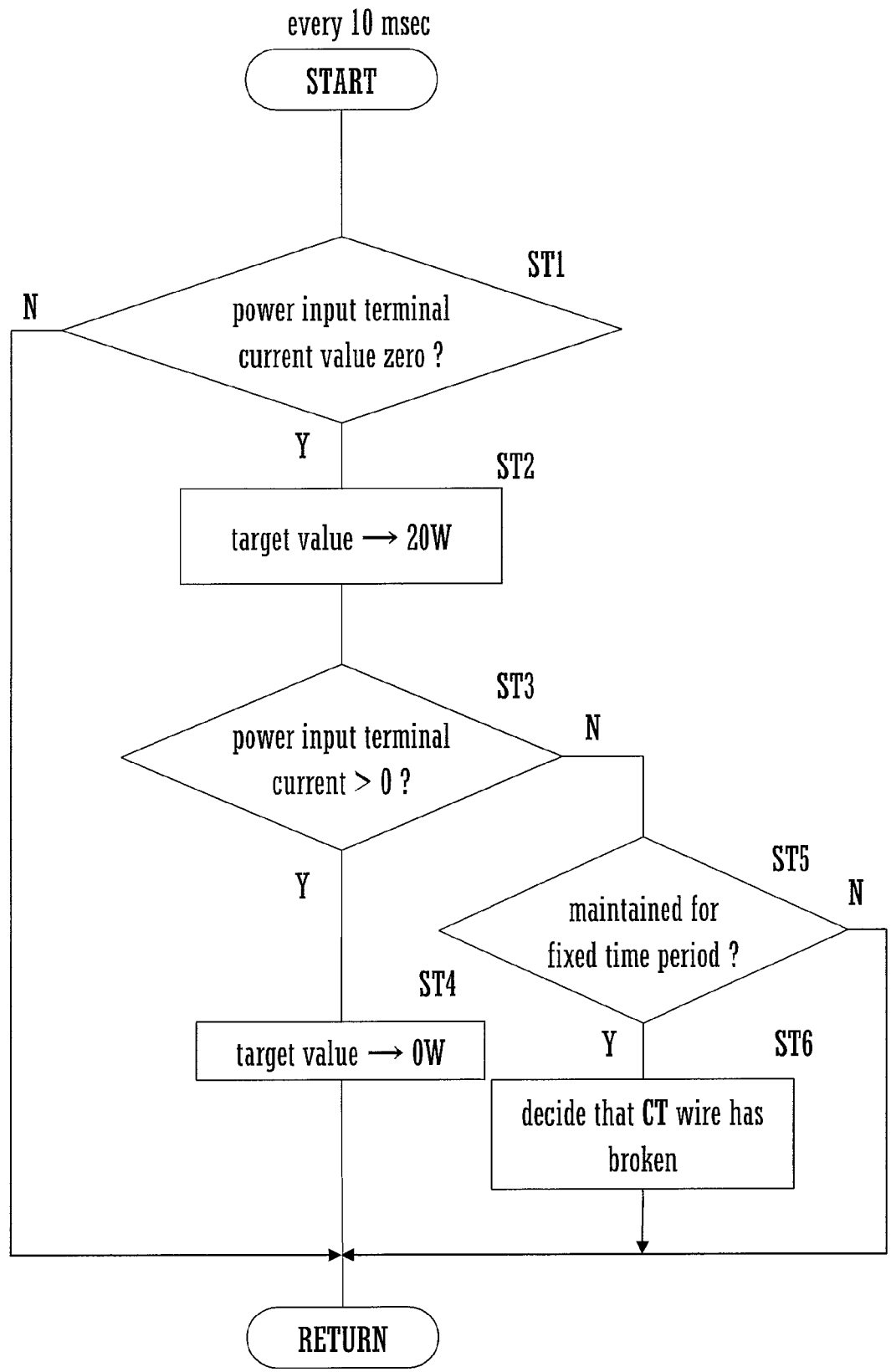

CONVERTER FOR ELECTRICAL POWER RECOVERY

TECHNICAL FIELD

The present invention relates to an in-house generation power supply system for household use, and more particularly relates to a converter for electrical power recovery which accumulates excess power as surplus power, if the output power of in-house power generation exceeds the power consumed by the load.

BACKGROUND ART

An in-house generation power supply system is a system which supplies power to a load by connecting the commercial electric power system and an in-house power generation device to the load in parallel. Normally, as an in-house power generation device, there is implemented an engine generator device which utilizes fossil fuel, or a solar power generator which utilizes sunlight, or the like.

However, with an in-house generation power supply system, in order to perform supply of power to the load with the power system and the in-house power generation device operating in cooperation, if the power generated by the in-house power generation device exceeds the amount of power consumed by the load, sometimes it happens that this surplus power may flow in reverse into the commercial electric power system. In this case, unless the electrical power company has made a contract to purchase this power flowing in reverse, it is necessary to ensure that this surplus power does not flow into the system.

With this objective, a converter for electrical power recovery may be provided to an in-house generation power supply system. Such a converter for electrical power recovery may comprise, for example, a device which converts the surplus power into heat and stores it thermally as hot water. A converter for electrical power recovery having this structure is a so called co-generation system. With a co-generation system, the energy which has been stored as heat may be recovered with a fuel cell system, or may be used for some other application by being conducted to a heat exchange device.

The converter for electrical power recovery described in Patent Document #1 comprises a thermal storage unit which accumulates power (comprising a heater which stores heat from the surplus power), a sensor unit which detects the power received from the system, a switching circuit which controls the input power to the thermal storage unit, and a control unit which controls the switching circuit based upon the received power detected by the sensor unit and sets the input power to the thermal storage unit. With a converter for electrical power recovery having this type of structure, since it is possible to detect with the sensor unit whether or not surplus power is being generated (by detecting the presence or absence of reverse flow in a power reception unit), when surplus power is available, it is possible to recover surplus power into the thermal storage unit by controlling the switching unit. Since the amount of power received from the system is zero when it is possible to recover the surplus power perfectly in the thermal storage unit, the output of the sensor unit also becomes zero. Accordingly, the control unit is able to decide that the surplus power is being recovered by knowing that the output of the sensor unit becomes zero.
Patent Document #1: Japanese Laid-Open Patent Publication 2004-92458.

DISCLOSURE OF INVENTION

Problems to be Solved by the Invention

However, with the above described converter for electrical power recovery, it is not possible to detect whether the cause for the output of the sensor unit becoming zero is due to actual recovery of power, or due to breakage of a wire of the sensor unit.

Accordingly, if the output of the sensor unit is being detected as zero due to breakage of a wire of the sensor unit, then the control unit will perform erroneous control, and as a result the problem arises that this leads to anomalous operation.

The object of the present invention is to provide a converter for electrical power recovery, which is able reliably to detect breakage of a wire of the sensor unit.

Means for Solving Problem

The converter for electrical power recovery according to the present invention comprises: a power input terminal which receives power from a commercial power supply system, an in-house power generation device which supplies power to a load by setting up cooperation between input terminal power at said power input terminal and in-house generated power which is generated in-house, a power accumulation device which accumulates power, and a control unit which, when said in-house generated power has exceeded the power consumed by said load, controls the input power to said power accumulation device so that the surplus power, which is the amount of said excess, is accumulated in said power accumulation device.

For the power accumulation device, there may be used a thermal storage device which converts power to heat and thermally stores that heat.

In the normal operational state, the load is driven by cooperation between the input terminal power and the in-house generated power. For example, if the power consumed by the load is 1000 W and the in-house generated power is 800 W, then the input terminal power is 200 W. In this case, the load is driven in the proportion of 2 (the input terminal power) to 8 (the in-house generated power).

If the power consumed by the load is less than the in-house generated power, then surplus power is generated. For example, if the power consumed by the load drops from 1000 W to 500 W, then there is 300 W of surplus power, since the in-house generated power is 800 W. Since surplus power is generated, the input terminal power becomes zero. The control unit inputs the surplus power to the power accumulation device, in order for the surplus power not to flow in reverse into the commercial power system.

With the structure described above, the converter for electrical power recovery of the present invention comprises a switching unit, which is provided at the power input side of said power accumulation device, and which switches said input power and inputs it to said power accumulation device, and a sensor unit, which is provided to said power input terminal, and which detects the magnitude of the current flowing in said power input terminal.

Moreover, said control unit of the present invention comprises: a switching control means which, when said in-house generated power is larger than the power consumed by said load, performs a first type of control in which it controls said switching unit so that the output of said sensor unit becomes approximately zero, and which, when the output of said sensor unit is approximately zero, performs a second type of control in which it controls said switching unit so that the output of said sensor unit becomes a value which corresponds to a predetermined target received power; and a sensor unit decision means which decides that said sensor unit is anomalous if, during said second type of control by said switching control means, the output of said sensor unit is not elevated and is approximately zero.

In the first type of control, the switching unit is controlled in order to input the surplus power to the power accumulation device.

And, in the second type of control, control is performed in order to investigate whether the cause for the output of said sensor unit becoming approximately zero is due to the first type of control, or is due to an anomaly of the sensor unit (which may be supposed to be caused by breakage of a wire of the sensor unit, or the like). In other words, in the second type of control, when the output of said sensor unit is approximately zero, said switching unit is controlled so that the output of said sensor unit becomes a value which corresponds to a predetermined target received power. Accordingly, said switching unit is controlled so that the input power to the power accumulation device is somewhat increased. As a result, power which has been increased to this extent is inputted from the power input terminal.

At this time, the sensor unit decision means decides that said sensor unit is anomalous, if the output of said sensor unit is not elevated and is approximately zero. And the sensor unit decision means decides that said sensor unit is normal, if the output of said sensor unit is slightly elevated. If the sensor unit is normal, then the switching unit is controlled so that, according to the first type of control, all of the surplus power is again inputted to the power accumulation device.

EFFECTS OF THE INVENTION

According to the present invention, along with it being possible reliably to prevent reverse flowing of surplus power to the side of the commercial electric power system, if the power consumed by the load has become less than the power obtained by in-house power generation, it is also possible, without exerting any influence upon this control, for the sensor unit always correctly to decide whether an anomaly has occurred or whether the situation is normal.

BRIEF DESCRIPTION OF THE DRAWINGS

FIG. 2 is a flow chart showing the operation of a control unit.

EXPLANATION OF REFERENCE NUMBERS

Figure 1:
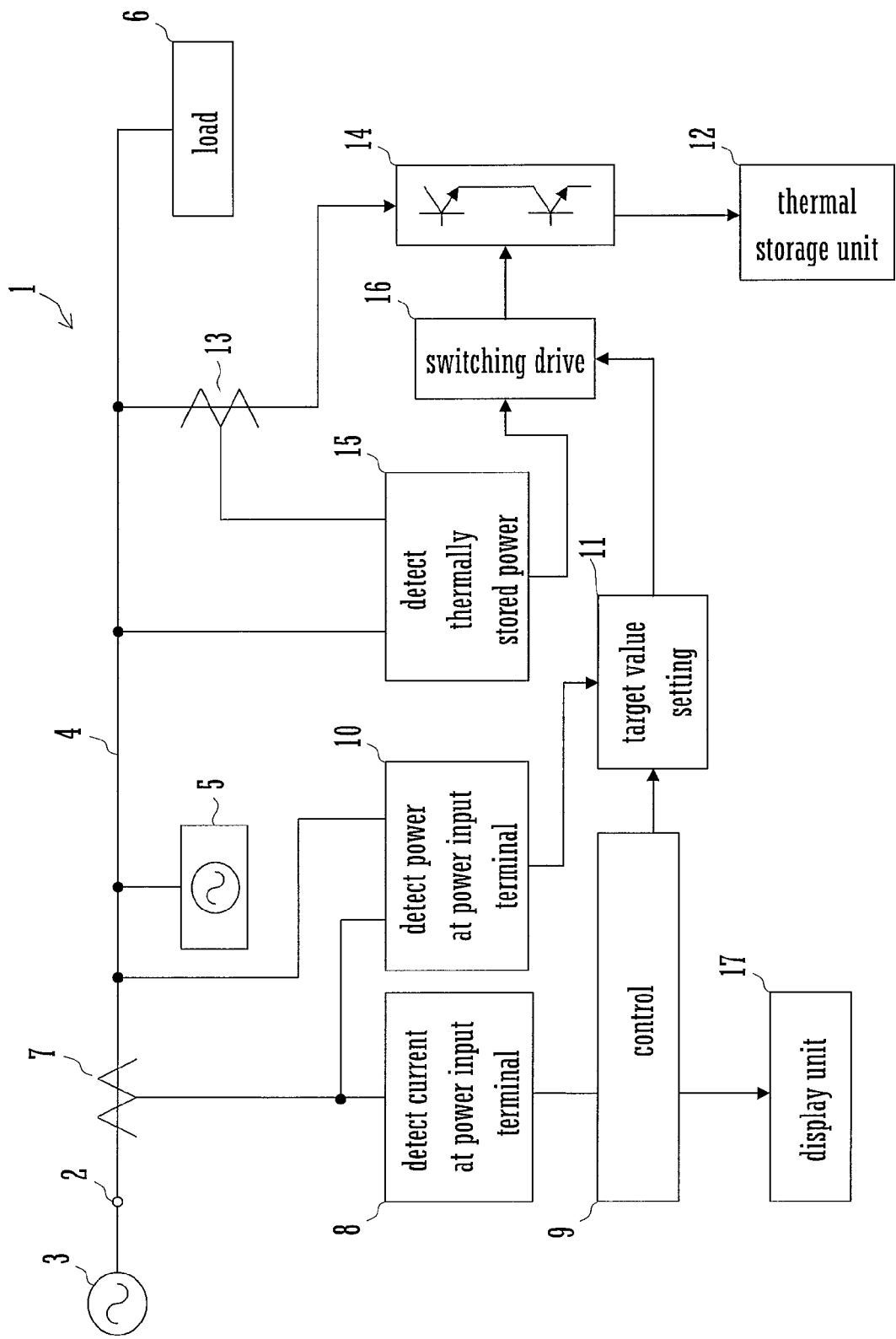
FIG. 1 is a structural diagram of a converter for electrical power recovery according to an embodiment of the present invention.

1: converter for electrical power recovery
2: power input terminal
5: in-house power generation device
7: first current converter (CT)

BEST MODE FOR CARRYING OUT THE INVENTION

FIG. 1 is a block diagram of a converter for electrical power recovery according to an embodiment of the present invention.

In FIG. 1, the commercial power supply system 3 (hereinafter termed the "system") is connected to a power input terminal 2 at the power input side of a converter for electrical power recovery 1. And a power supply line 4 is connected to the power input terminal 2 at its converter 1 side. An in-house power generation device 5, such as an engine generator or the like, and a load 6 are connected to this power supply line 4, and power is supplied to the load 6 by the system 3 and the in-house power generation device 5 operating in mutual cooperation. A first current converter (CT) 7 is connected to the power input terminal 2. The output of this CT 7 is connected to a power input terminal current detection unit 8. The current flowing at the power input terminal 2 (the power input terminal current) is detected by this power input terminal current detection unit 8.

The value of the power input terminal current detected by the power input terminal current detection unit 8 is inputted to a control unit 9 and to a input terminal power detection unit 10.

The control unit 9 is endowed with a function of deciding upon whether or not a wire of the CT 7 is broken, and with a function of generating a signal for the target value of the input terminal power. And, if it has been decided by the control unit 9 that wire breakage of the CT 7 has occurred, then a display unit 17 displays the result of this decision.

The input terminal power detection unit 10 calculates the input terminal power and the direction of the current based upon the power input terminal current value and the value of the voltage at the power input terminal 2. The value of this input terminal power (including a symbol which denotes the direction of the current) is outputted to a target value setting unit 11.

The converter for electrical power recovery 1 comprises a thermal storage unit 12 which converts the surplus power into heat, which it accumulates. A second current converter (CT) 13 and a switching circuit 14 are connected between the thermal storage unit 12 and the power supply line 4. The output of the CT 13 is inputted to a thermally stored power detection unit 15. The output of the CT 13 described above and the power supply line 4 are connected to the thermally stored power detection unit 15, and thereby this detection unit 15 calculates the magnitude of the thermally stored power which is thermally stored (recovered) in the thermal storage unit 12.

The output of this thermally stored power detection unit 15 and the output of the target value setting unit 11 are inputted to a switching drive unit 16. The switching drive unit 16 drives the switching circuit 14 by switching it at high frequency, so as to make the magnitude of the thermally stored power calculated by the thermally stored power detection unit 15 be equal to the target value set by the target value setting unit 11.

It should be understood that the switching drive unit 16 consists of a per se known drive circuit which switches a switching element within the switching circuit 14 by PWM control or frequency control.

In the circuit structure described above, the control unit 9 sets the initial value of the target value to zero. Due to this, the converter for electrical power recovery 1 described above operates as follows.

(1) If the power consumed by the load 6 is greater than the in-house generated power (the state "S1"):

In this case, the deficiency of power is supplied from the commercial power system 3. For example, if the power consumed by the load 6 is 1200 W and the maximum output power of the in-house power generation device 5 is 1000 W, then the deficiency of power is 200 W. This deficiency of power is supplied from the system 3.

The input terminal power is detected as being 200 W by the input terminal power detection unit 10, and the target value setting unit 11 acquires this value. Thus, the target value setting unit 11 outputs the error (a negative value) between the input terminal power of 200 W which has been acquired and zero, so that the input terminal power becomes zero. This error is outputted to the switching drive unit 16, and the switching drive unit 16 drives the switching circuit 14 so that the thermally stored power detected by the thermally stored power detection unit 15 becomes of a magnitude which corresponds to the above described error. Since this state "S1" is a state in which a shortage of power is occurring, the error described above is a value which brings the thermally stored power towards zero. Accordingly, in this state "S1", a completely OFF state of the switching circuit 14 is maintained.

(2) If the power consumed by the load 6 is less than the in-house generated power (the state "S2"):

In this case, an excess of power is generated within the converter for electrical power recovery 1. For example, if the power consumed by the load 6 is supposed to be 200 W and the rated output power of the in-house power generation device 5 is supposed to be 800 W, then the excess of power becomes 600 W. This excess of power is supplied from the system 3. The switching circuit 14 performs switching operation so that this surplus power is all inputted to the thermal storage unit 12. In other words, the target value setting unit 11 outputs the error (a positive value) between the input terminal power 600 W which has been acquired and zero, so that the input terminal power becomes zero (so that the surplus power of 600 W does not flow in reverse to the side of the system 3). This error is outputted to the switching drive unit 16, and the switching drive unit 16 drives the switching circuit 14 (a first type of control) so that the thermally stored power detected by the thermally stored power detection unit 15 becomes of a magnitude which corresponds to the above described error. Since this state "S2" is a state in which an excess of power is occurring, the error described above is a value in the direction to increase the thermally stored power. Accordingly, in this state "S2", ON/OFF control of the switching circuit 14 is performed.

(3) The CT monitoring operation:

The control unit 9 of the converter for electrical power recovery 1 periodically detects whether or not any anomaly caused by breakage of a wire of the CT 7 has occurred.

When the control unit 9 detects that the power input terminal current as detected by the power input terminal current detection unit 8 is zero (including approximately zero), then it decides whether the cause thereof is due to a breakage of a wire of the CT 7, or due to control according to the state "S2" described above. For this decision, a signal is outputted to the target value setting unit 11 for making the target value set by the target value setting unit 11 be 20 W, which is a constant value. This target value is a target value for the supplied power inputted from the system 3. Due to this, the target value set by the target value setting unit 11 is changed from zero to 20 W. When this is done, the switching drive unit 16 drives the switching circuit (a second type of control) so that the surplus power which is being thermally stored in the thermal storage unit 12 is increased by 20 W. At this time, if breakage of a wire of the CT 7 has occurred, then the power input terminal current which is detected by the power input terminal current detection unit 8 is elevated from the zero level to a level which corresponds to just 20 W.

On the other hand, if no breakage of a wire of the CT 7 has occurred, then the power input terminal current which is detected by the power input terminal current detection unit 8 stays the same at zero.

Thus, the control unit 9 decides upon whether or not breakage of a wire of the CT 7 has taken place (a sensor unit decision means) by deciding whether the power input terminal current which is detected by the power input terminal current detection unit 8 is somewhat raised from its zero level, or alternatively is kept at zero.

And, if the control unit 9 has decided that the CT 7 is anomalous (i.e. that wire breakage has taken place), then it performs error processing (notification or the like).

It should be understood that the above described target value of 20 W is a value which is sufficiently small with respect to the rated output of the in-house power generation device 5. Furthermore, the time period for the target value to be returned from 20 W to zero if the CT 7 is normal is extremely short. Accordingly, the control for monitoring the CT 7 exerts almost no influence upon the overall control for bringing the input terminal power to zero.

The control unit 9 may execute the above CT monitoring operation, for example, every 10 msec.

FIG. 2 is a flow chart showing the operation of the control unit 9 in concrete terms.

When entering upon this CT monitoring operation, a decision is made as to whether or not the power input terminal current is zero (a step ST1). By zero is meant a magnitude which is interpreted so as to include any error, and also so as to include the power consumed within the circuitry (for example, the power consumed by the switching circuit 14). If this current is not zero, then it is decided that the amount of power which is lacking is being received from the system 1, and the flow of processing terminates. Moreover, it is also decided that CT 7 is normal.

And, if the power input terminal current is zero, then it is decided whether the cause thereof is due to the breakage of a wire of the CT 7, or is due to control in the state "S2" described above.

Initially, the above described target value is set to 20 W (a step ST2). Next, a decision is made as to whether or not the power input terminal current is greater than zero (a step ST3). If the power input terminal current is greater than zero, then it is decided that the CT 7 is normal, and the processing terminates. If the power input terminal current is maintained at zero, then a decision is made (a step ST5) as to whether or not this state has been sustained for a fixed time period, and if it has thus been sustained, then it is decided that breakage of a wire of the CT 7 has occurred (a step ST6). The flow of control then proceeds to alarm processing not shown in the figure. In this alarm processing, the fact that a wire has broken is displayed upon the display unit 17. But, if the state in which the power input terminal current is zero is not sustained for the fixed time period, then processing terminates, since there is a possibility that the fact that it was decided that the power input terminal current was greater than zero, was a mistaken decision caused by noise or the like.

The control unit 9 repeatedly executes the processing shown in FIG. 2 every 10 msec. On the other hand, based upon the error outputted from the target value setting unit 11, the switching drive unit 16 always controls the switching circuit 14 so that the input terminal power becomes equal to the target value. Moreover, the target value of 20 W described above is a value which is sufficiently small in relation to the rated output of the in-house power generation device 5. Furthermore, the time period for the target value to be returned from 20 W to zero if the CT 7 is normal is extremely short. Accordingly, the control for monitoring the CT 7 exerts almost no influence upon the overall control for making the input terminal power equal to zero.

INDUSTRIAL APPLICABILITY

This invention can be applied to a co-generation system for household or workplace use.

The invention claimed is:

1. A converter for electrical power recovery comprising a power input terminal which receives power from a commercial power supply system, an in-house power generation device which supplies power to a load by setting up cooperation between input terminal power at the power input terminal and in-house generated power which is generated in-house, a power accumulation device which accumulates power, and a control unit which, when the in-house generated power has exceeded the power consumed by the load, controls the input power to the power accumulation device so that the surplus power, which is the amount of the excess, is accumulated in the power accumulation device, comprising:

a switching unit which is provided at the power input side of the power accumulation device, and which switches the input power and inputs it to the power accumulation device; and a sensor unit, which is provided to the power input terminal, and which detects the magnitude of the current flowing in the power input terminal;

and wherein the control unit comprises:

a switching control means which, when the in-house generated power is larger than the power consumed by the load, performs a first type of control in which it controls the switching unit so that the output of the sensor unit becomes approximately zero, and which, when the output of the sensor unit is approximately zero, performs a second type of control in which it controls the switching unit for an extremely short time to the extent that no influence is exerted upon the first type of control so that the output of the sensor unit becomes a value which corresponds to a predetermined target received power which is larger than zero and the input power corresponding to the target received power is accumulated in the power accumulation device in an operating state where the in-house power generation device supplies power to the load by setting up cooperation between the input terminal power at the power input terminal and the in-house generated power generated in-house; and a sensor unit decision means which decides that the sensor unit is anomalous if, during the second type of control by the switching control means, the output of the sensor unit is not elevated and is approximately zero.

2. The converter for electrical power recovery according to claim 1, wherein the switching unit includes a switching element which switches at high frequency, and a switching drive unit which PWM drives the switching element.

3. The converter for electrical power recovery according to claim 1, wherein the power accumulation device is a thermal storage device which converts power to heat.

* * * * *